(12) United States Patent
Keller (10) Patent No.: US 6,902,227 B2
(45) Date of Patent: Jun. 7, 2005

(54) EXTRUDABLE ENERGY ABSORBER

(75) Inventor: Gerald J. Keller, Shelby Township, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 10/390,086

(22) Filed: Mar. 17, 2003

(65) Prior Publication Data

US 2004/0183336 A1 Sep. 23, 2004

(51) Int. Cl.[7] .................... B60R 21/02; B62D 25/04; B62D 27/00
(52) U.S. Cl. ................ 296/187.05; 296/203.03; 296/193.06
(58) Field of Search ............ 296/187.05, 187.03, 296/1.08, 203.01, 203.02, 203.03, 205, 193.01, 193.02, 193.05, 193.06; 280/748, 751, 784, 808, 801.1, 801.2; 297/483

(56) References Cited

U.S. PATENT DOCUMENTS

| | | | | |
|---|---|---|---|---|
| 3,625,562 A | * | 12/1971 | Barenyi et al. | ............ 296/37.1 |
| 3,779,595 A | * | 12/1973 | Suzuki et al. | .......... 296/187.05 |
| 4,135,756 A | * | 1/1979 | Hausmann | ................. 296/285 |
| 4,398,749 A | * | 8/1983 | Hipp et al. | ............. 280/801.1 |
| 4,470,619 A | * | 9/1984 | Imajyo et al. | ............... 280/808 |
| 4,610,464 A | * | 9/1986 | Yasumatsu et al. | ...... 280/801.2 |
| 4,786,081 A | * | 11/1988 | Schmidt | .................. 280/801.2 |
| 4,907,821 A | * | 3/1990 | Fohl | ........................ 280/801.2 |
| 4,971,359 A | * | 11/1990 | Takahashi et al. | ....... 280/801.2 |
| 5,246,264 A | * | 9/1993 | Yoshii | ................... 296/203.03 |
| 5,529,344 A | | 6/1996 | Yasui et al. | |
| 5,660,426 A | * | 8/1997 | Sugimori et al. | ...... 296/187.05 |
| 5,692,780 A | * | 12/1997 | Yasui | ..................... 280/801.2 |
| 5,720,510 A | * | 2/1998 | Daniel et al. | .......... 296/187.05 |
| 5,791,687 A | | 8/1998 | Gotou et al. | |
| 5,826,907 A | | 10/1998 | Saito et al. | |
| 5,833,303 A | * | 11/1998 | Kawai et al. | .......... 296/187.05 |
| 5,863,069 A | | 1/1999 | Wickenheiser et al. | |
| 5,941,597 A | * | 8/1999 | Horiuchi et al. | ....... 296/203.01 |
| 6,007,100 A | | 12/1999 | Steffens, Jr. | |
| 6,168,206 B1 | | 1/2001 | Greib et al. | |
| 6,217,109 B1 | * | 4/2001 | Okana et al. | .......... 296/203.03 |
| 6,244,626 B1 | | 6/2001 | Monaghan et al. | |
| 6,254,133 B1 | | 7/2001 | Schmid | |
| 6,254,172 B1 | * | 7/2001 | Takahara | ............... 296/187.05 |
| 6,267,436 B1 | * | 7/2001 | Takahara | ............... 296/187.05 |
| 6,273,469 B1 | | 8/2001 | Kwaske et al. | |
| 6,302,477 B1 | * | 10/2001 | Satou | ..................... 296/187.05 |
| 6,485,056 B2 | | 11/2002 | Dietrich | |
| 6,619,727 B1 | * | 9/2003 | Barz et al. | ............... 296/146.6 |
| 6,702,368 B1 | * | 3/2004 | Hanyu | .................... 296/193.06 |
| 6,705,669 B1 | * | 3/2004 | Pearcy et al. | .......... 296/187.05 |

FOREIGN PATENT DOCUMENTS

JP            401156181     *  6/1989    ............ 296/203.01

* cited by examiner

Primary Examiner—H. Gutman
(74) Attorney, Agent, or Firm—Sally J. Brown (57) ABSTRACT

An energy absorber for protecting the occupants of a vehicle. The energy absorber includes an interior portion and a first contact surface at least partially surrounding the interior portion. The first contact surface is attachable to a structural member of the vehicle. The energy absorber also includes at least one hollow cavity extending through the interior portion in a direction substantially parallel to the first contact surface. During a vehicle collision, the first contact surface absorbs energy from occupant impact with an interior trim piece by deforming into the hollow cavity.

36 Claims, 6 Drawing Sheets

EXTRUDABLE ENERGY ABSORBER

BACKGROUND OF THE INVENTION

1. Field of the Invention

The present invention relates to an energy absorber designed to protect the occupants of a vehicle during a collision. More specifically, the invention relates to an device that absorbs energy from a collision involving a structural member of the vehicle.

2. Description of Related Art

An important issue facing vehicle manufacturers involves providing increased protection to vehicle occupants in the event of a collision. In recent years, some manufacturers have started adding energy absorbing members, or energy absorbers, to their vehicles. Such energy absorbers are typically positioned between a structural member of the vehicle body and one or more interior trim pieces. For example, an energy absorber may be positioned between the B-pillar and an interior trim piece covering the B-pillar. Other structural members where energy absorbers are typically installed include the A-pillar, the roof rail, the bumpers, and so forth.

During a collision involving a vehicle, occupants may move from their initial position with respect to the vehicle and impact one or more interior trim pieces such as a door trim panel, an A-pillar cover, a B-pillar cover, etc. If one or more energy absorbers are positioned between the interior trim pieces and structural members of the vehicle, the energy absorbers may reduce the likelihood of injury to the occupants.

There are, however, several disadvantages with known energy absorbers. For example, honeycomb structures produced from either paper (e.g., kraft, NOMEX® etc.), aluminum, or plastic have been used as energy absorbers. However, the potential for moisture absorption makes paper honeycomb undesirable for long life applications. Aluminum honeycomb is expensive to manufacture, and is also subject to corrosion and conductivity of heat and electricity. Plastic honeycomb is both difficult and expensive to manufacture. Moreover, honeycomb structures in general typically only perform well in a single impact direction. If the honeycomb is struck off-axis, its effectiveness is reduced considerably.

Moreover, in some vehicles, an adjustable turning loop (ATL) assembly may be positioned between the energy absorber and the interior trim member. The ATL assembly is part of the seat belt assembly, and consists of a turning loop portion and a height adjusting mechanism. The turning loop portion routes a shoulder belt portion of the seat belt over and across the shoulder of an occupant of the vehicle. The height adjusting mechanism allows the vertical position of the turning loop to be adjusted by an occupant of the vehicle, and includes a track portion and a slidable carriage which moves within the track portion.

There are cost and design issues associated with attaching known energy absorbers to an ATL assembly. For example, the track portion of an ATL assembly may be shaped differently (straight, curved, etc.) in different vehicles. It is desirable to provide an energy absorber that will conform to the shape of the track portion. Therefore, different energy absorbers must typically be designed for different types of vehicles.

Accordingly, it would be an advancement in the art to provide an energy absorber that will absorb energy from a collision even if the impact force is off-axis (i.e., not exactly perpendicular) to the energy absorber. It would be a further advancement in the art to provide an energy absorber which may be fabricated relatively easily at a lower cost than existing energy absorbers, and which may be used in conjunction with different ATL assemblies. The present invention provides these advancements in a novel and useful way.

SUMMARY OF THE INVENTION

The apparatus of the present invention has been developed in response to the present state of the art, and in particular, in response to the problems and needs in the art that have not yet been fully solved by currently available energy absorbers. Thus, an energy absorber for protecting the occupants of a vehicle is disclosed. The energy absorber includes an interior portion. A first contact surface at least partially surrounding the interior portion is also provided. The first contact surface is attachable to a structural member of the vehicle. The energy absorber also includes at least one hollow cavity extending through the interior portion in a direction substantially parallel to the first contact surface. During a vehicle collision, the first contact surface absorbs energy from occupant impact with an interior trim piece by deforming into the hollow cavity. The energy absorber also includes a second contact surface opposite the first contact surface. The second contact surface may be configured to be attached to an adjustable turning loop (ATL) assembly.

The energy absorber may be capable of conforming to match the shape of the structural member to which it is attached. For example, the first contact surface of the energy absorber and the interior portion of the energy absorber may each include at least one crease. In embodiments where the energy absorber is also attached to an ATL assembly, the energy absorber may also be capable of conforming to match the shape of the ATL assembly. Both the structural member and the ATL assembly may be straight, curved, or any other desired shape.

The length of the energy absorber may be the same as the length of the ATL assembly. Alternatively, the length of the energy absorber may be different than the length of the ATL assembly.

The interior portion of the energy absorber may include a curved portion. A hollow cavity may extend through the curved portion in a direction substantially parallel to the first contact surface.

The hollow cavity in the interior portion of the energy absorber may be a wide variety of shapes. For example, the hollow cavity may possess a substantially rectangular cross-section, a substantially circular cross-section, a substantially triangular cross-section, or any other suitable shape.

The hollow cavity may be formed by conveying an extrudable material through a die. The extrudable material may be a crystalline resin, a polypropylene resin, a PVC resin, or any other suitable material.

BRIEF DESCRIPTION OF THE DRAWINGS

In order that the manner in which the above-recited and other advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

It will be readily understood that the components of the embodiments as generally described and illustrated in the Figures herein could be arranged and designed in a wide variety of different configurations. Thus, the following more detailed description of certain exemplary embodiments of the present invention is not intended to limit the scope of the invention, as claimed, but is merely representative of the embodiments of the invention.

Figure 1:
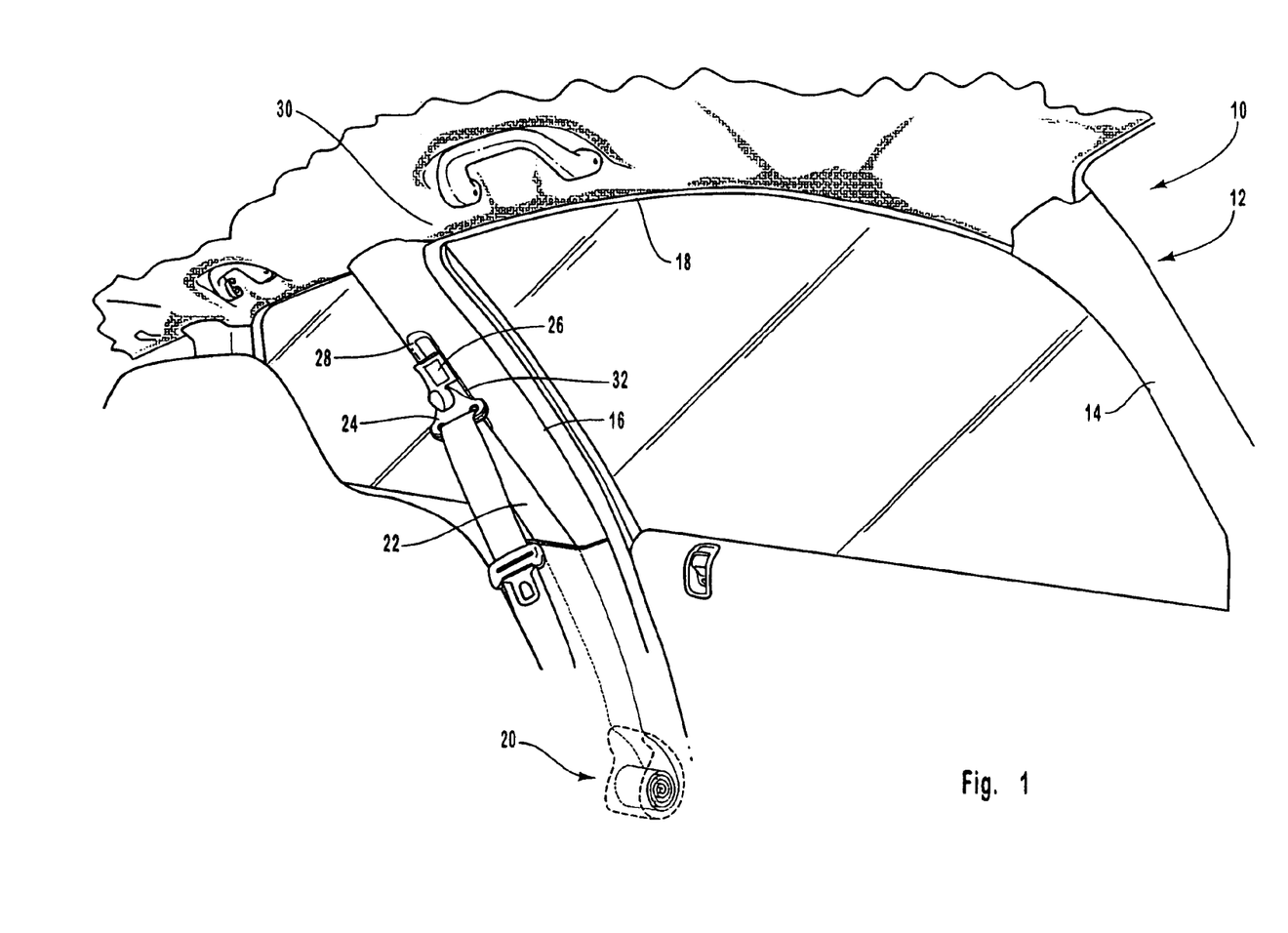
FIG. 1 is a plan view of a side interior portion of a vehicle.

Referring now to FIG. 1 there is shown a vehicle 10, and more particularly the construction of a side interior portion 12 of the vehicle 10. The vehicle 10 includes a number of structural members that provide structural support to the vehicle 10. In the embodiment shown in FIG. 1, the structural members include an A-pillar 14, a B-pillar 16, and a roof rail 18 which connects the A-pillar 14 and the B-pillar 16. The various structural members of the vehicle 10 are typically covered by decorative trim pieces such as an upper trim piece 30.

The vehicle 10 also includes a safety restraint system 20. The safety restraint system 20 includes a seat belt having a shoulder belt portion 22. The shoulder belt portion 22 is positioned and guided by a turning loop 24, which routes the shoulder belt portion 22 over and across the shoulder of an occupant of the vehicle 10. The turning loop 24 is attached to a height adjusting mechanism 26. The height adjusting mechanism 26 includes a track portion and a slidable carriage (not shown) which moves within the track and permits an occupant to adjust the vertical position of the turning loop 24. Because the vertical position of the turning loop 24 may be adjusted by an occupant, the turning loop 24 and height adjusting mechanism 26 are often collectively referred to as an adjustable turning loop (ATL) assembly 28. The various elements of the ATL assembly 28 are typically covered by decorative trim pieces such as ATL trim piece 32.

The ATL assembly 28 may be attached to one or more structural members of the vehicle 10. For example, in the embodiment shown in FIG. 1, the track portion of the ATL assembly 28 is attached to the B-pillar 16. Any suitable attachment mechanism may be used, such as a threaded fastener, a tongue and groove fastener, or the like.

The ATL assembly 28 may conform to the shape of the structural member to which it is attached. For example, in FIG. 1, the B-pillar 16 has a substantially flat surface. The ATL assembly 28 conforms to the shape of the B-pillar 16, i.e., the ATL assembly 28 also has a substantially flat surface which rests against the substantially flat surface of the B-pillar 16. In alternative embodiments, the B-pillar 16 and the ATL assembly 28 may be substantially curved, or any other desired shape.

During a collision involving the vehicle 10, an object (e.g., a barrier or another vehicle) may strike the vehicle 10. Some or all of the energy of the striking object may be transferred to one or more structural members and/or the ATL assembly 28. For example, in a side impact collision, an object may strike the side of the vehicle 10 at the location of the B-pillar 16. The energy of the striking object may be transferred to the B-pillar 16, causing it to collapse inward. If an ATL assembly 28 is attached to the B-pillar 16, energy may be further transferred to the ATL assembly 28, causing it too to collapse inward. This chain of events may cause one or more interior trim pieces to strike an occupant of the vehicle 10.

One way to absorb impact energy from occupants striking interior trim pieces in a vehicle crash is to attach an energy absorber (not shown in FIG. 1) to one or more of the structural members of the vehicle 10. For example, an energy absorber may be attached to the B-pillar 16. When the B-pillar 16 is struck and begins to collapse inward, the energy absorber may absorb some of the energy from the collapsing B-pillar 16. The energy absorber may therefore dissipate impact energy that would otherwise be transferred to vehicle occupants from contact with the interior trim pieces. Accordingly, the energy absorber may reduce the chance of injury to an occupant of the vehicle 10 during a collision.

Figure 2A:
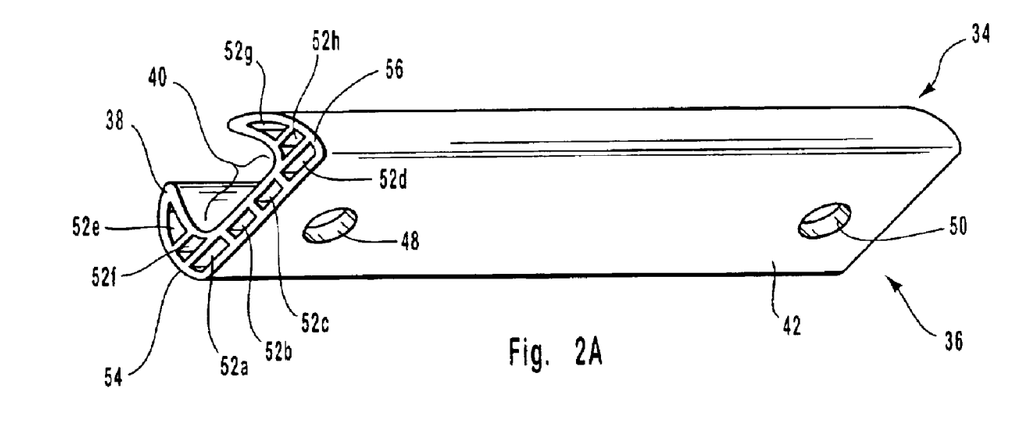
FIG. 2A is a perspective view of the bottom side of an energy absorber.

FIG. 2A shows a perspective view of the bottom side 36 of an embodiment of an energy absorber 34. As shown, the energy absorber 34 includes an interior portion 38. The interior portion 38 includes a straight portion 40 and a first contact surface 42 which borders the straight portion 40 on its bottom side 36.

Figure 2B:
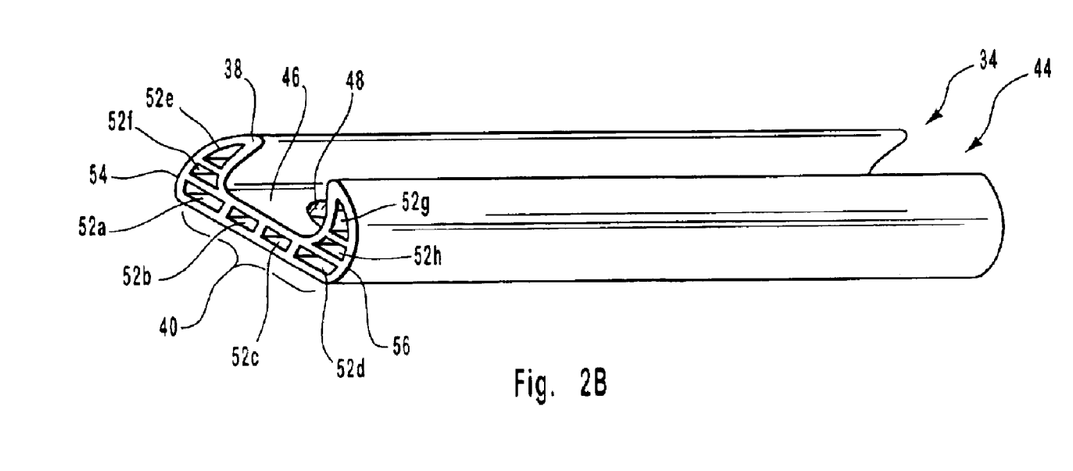
FIG. 2B is a perspective view of the top side of an energy absorber.

FIG. 2B shows a perspective view of the top side 44 of an embodiment of an energy absorber 34. The energy absorber 34 includes a second contact surface 46 which borders the straight portion 40 of the interior portion 38 on its top side 44.

The first contact surface 42 may be configured to be attached to a structural member of the vehicle 10, such as the B-pillar 16. For example, referring to FIGS. 2A and 2B collectively, two holes 48 and 50 may extend through the first contact surface 42, the interior portion 38, and the second contact surface 46. A piercing tool may be used to create the holes 48 and 50. Any suitable attachment mechanism may be inserted through the holes 48 and 50 and into matching holes (not shown) in the B-pillar 16 to attach the first contact surface 42 to the B-pillar 16. For example, a pair of threaded bolts may be used. In one embodiment, the bolts may have a larger diameter than the holes 48 and 50, and be held in place by resistance. Of course, in alternative embodiments the energy absorber 34 may be attached to any structural member of the vehicle 10 using any number of known attachment mechanisms.

The straight portion 40 of the interior portion 38 includes a plurality of hollow cavities 52a, 52b, 52c and 52d which extend through the interior portion 38 in a direction substantially parallel to the first contact surface 42 and the second contact surface 46. In a collision involving the vehicle 10, the second contact surface 46 may absorb energy from occupant impact with one or more interior trim pieces. For example, in a side impact collision, the second contact surface 46 may deform into the plurality of hollow cavities 52a, 52b, 52c and 52d in order to absorb energy from an occupant's impact with one or more interior trim pieces, such as the trim pieces that cover the B-pillar 16, the ATL assembly 28, roof rail 18, and the like. This may provide increased protection to the occupants of the vehicle 10.

The interior portion 38 of the energy absorber 34 also includes a first curved portion 54 and a second curved portion 56. A plurality of hollow cavities 52e and 52f extend through the first curved portion 54 in a direction substantially parallel to the first contact surface 42. Similarly, a plurality of hollow cavities 52g and 52h extend through the second curved portion 56 in a direction substantially parallel to the first contact surface 42. The first and second curved portions 54 and 56 may enhance the ability of the energy absorber 34 to absorb energy from a collision in which a vehicle occupant strikes the interior trim pieces at an angle that is not exactly perpendicular to the straight portion 40 of the energy absorber 34. However, the invention should not be construed as requiring one or more curved portions.

In one embodiment, an energy absorber 34 may be placed between a structural member of the vehicle and an ATL assembly 28. For example, with reference to FIG. 3, the energy absorber 34 may be placed between the ATL assembly 28 and the B-pillar 16. In particular, the ATL assembly 28 may include a hole 58. A threaded bolt 60 may be inserted through the hole 58 in the ATL assembly 28 and a similar hole 48 in the energy absorber 34. To attach the ATL assembly 28 and the energy absorber 34 to the B-pillar 16, the threaded bolt 60 may then be threaded into a mating feature in the B-pillar 16. Of course, the use of a threaded bolt 60 is exemplary only; any number of suitable attachment mechanisms may be used, including tongue and groove fasteners, threaded screws, and the like.

Figure 3:
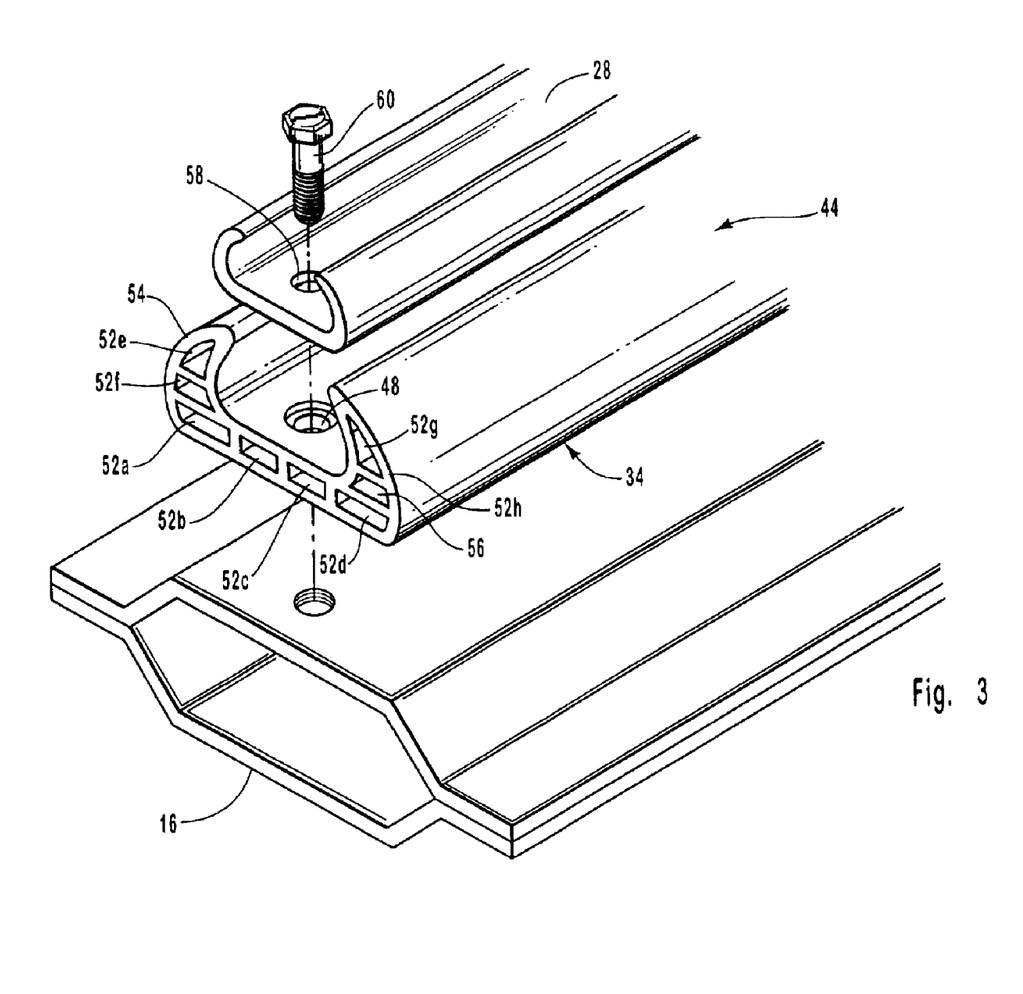
FIG. 3 is a perspective view of an ATL assembly attached to an energy absorber.

In embodiments where the energy absorber 34 is attached to an ATL assembly 28, the energy absorber 34 may be about equal to the length of the ATL assembly 28, as shown in FIG. 3. Alternately, the energy absorber 34 may be made longer than the ATL assembly 28 to provide additional energy absorbing capability near the ends of the ATL assembly 28.

Figure 4:
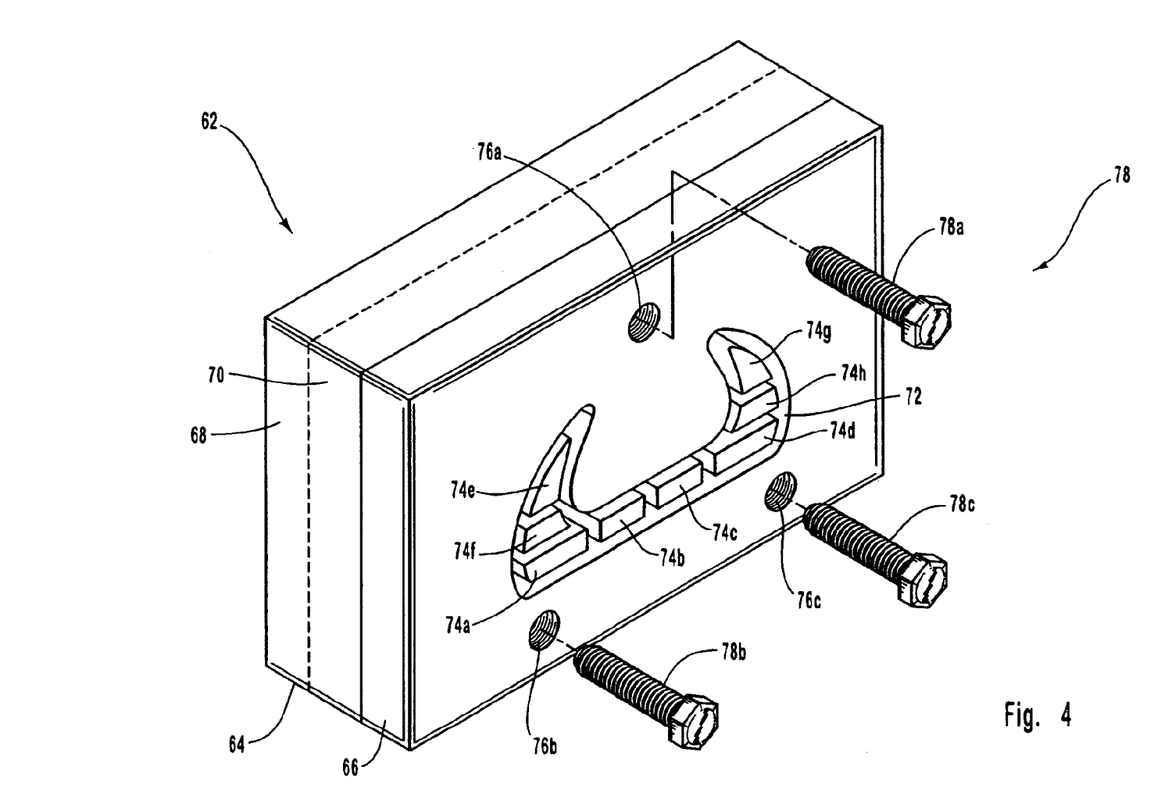
FIG. 4 is a perspective view of an extrusion die which may be used to prepare an energy absorber.

As noted previously, the energy absorber 34 may be formed by conveying an extrudable material through an extrusion die 62. Referring now to FIG. 4, there is shown a perspective view of an extrusion die 62 which may be used to prepare an energy absorber 34 in accordance with the invention. The extrusion die 62 may include a die body 64 and a die plate 66. The die body 64 may include a support portion 68 and a shaping portion 70. The support portion 68 may include an entrance cavity (not shown). The die plate 66 may include an exit cavity 72 which matches the shape of the energy absorber 34 to be extruded. A plurality of protrusions 74a, 74b, 74c, 74d, 74e, 74f, 74g and 74h matching the hollow cavities 52a, 52b, 52c, 52d, 52e, 52f, 52g and 52h shown above in FIGS. 2A and 2B may extend from the support portion 68, through the shaping portion 70, and into the die plate 66.

Both the die body 64 and the die plate 66 may include a plurality of recesses 76a, 76b, and 76c. Each recess 76 may be configured to receive an attachment mechanism 78 which may attach the die body 64 to the die plate 66. For example, the die body 64 and the die plate 66 may be held together by three bolts 78a, 78b, and 78c which may be threaded through the recesses 76a, 76b, and 76c.

An extrudable material suitably heated to its molten state may enter through the entrance cavity in the support portion 68. The molten extrudable material may then flow into the shaping portion 70, where it may be extruded past the protrusions 74 and into the desired form of the energy absorber 34. During this process, cooling may occur so that the energy absorber 34 may maintain its shape upon leaving the exit cavity 72. Additional details about the extrusion die 62 and the extrusion process generally will be readily apparent to those of ordinary skill in the art.

As stated previously, an ATL assembly 28 may conform to the shape of the structural member to which it is attached. Similarly, the energy absorber 34 may conform to the shape of a structural member and/or an ATL assembly 28 to which it is attached. One way in which this may be accomplished is by manufacturing the energy absorber 34 using an extrudable, flexible material such as a crystalline resin, a polypropylene resin, a polyvinyl chloride, or "PVC" resin, or the like. If an extrudable, flexible material is used, the energy absorber 34 may more readily conform to match the shape of a structural member than if such a material is not used. However, the invention should not be construed as requiring an extrudable, flexible material.

Figure 5:
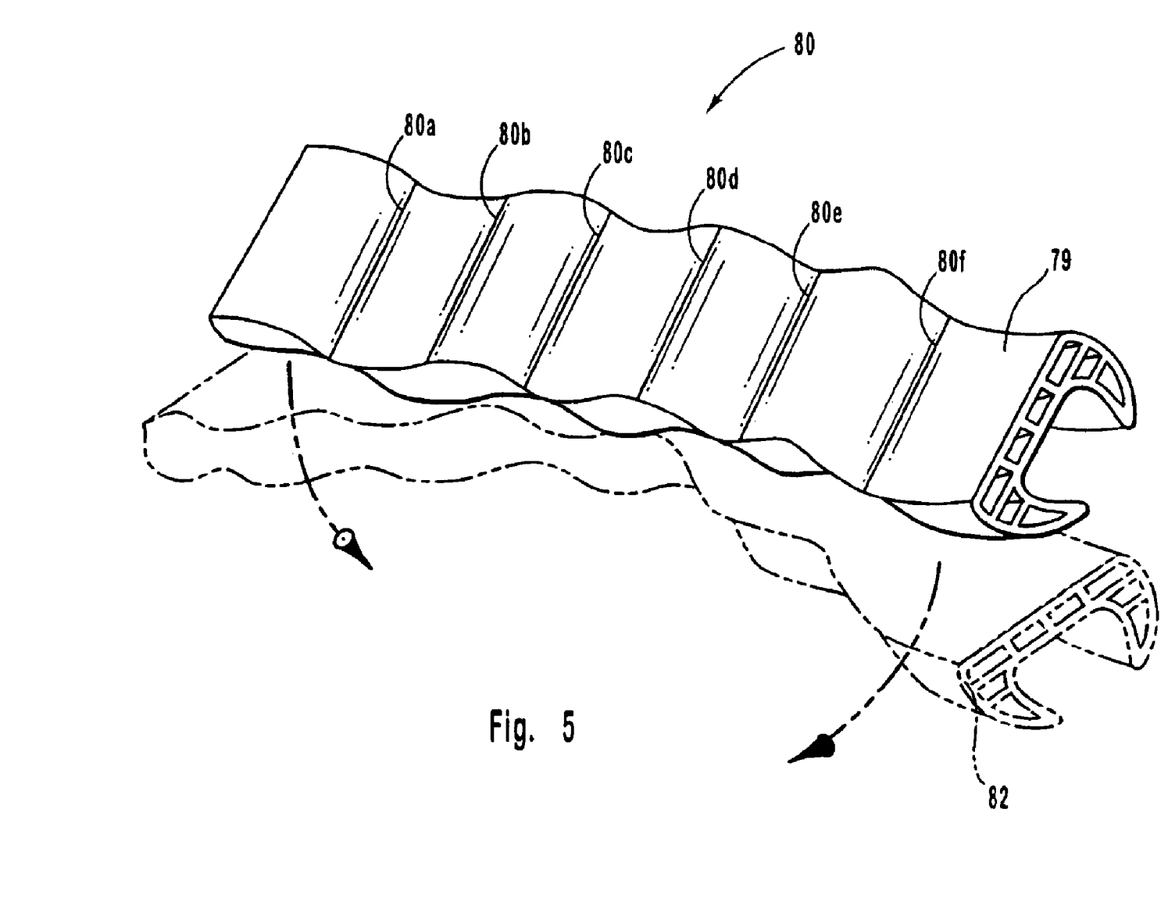
FIG. 5 is a perspective view of an energy absorber having a plurality of creases and a curved ATL assembly.

Another way in which an energy absorber may be made to conform to the shape of a structural member and/or an ATL assembly 28 is by the addition of one or more creases 80, as shown in FIG. 5. The energy absorber 79 shown in FIG. 5 includes six creases 80a, 80b, 80c, 80d, 80e, and 80f. These creases 80 extend through the first contact surface 42, the interior portion 38, and the second contact surface 46. FIG. 5 also shows an ATL assembly 82 having a curved shape. As illustrated in FIG. 5, the plurality of creases 80 in the energy absorber 79 make it easier to bend the energy absorber 79, thus simplifying the process of fitting the energy absorber 79 around the curved ATL assembly 28. Because the energy absorber 79 is capable of conforming to differently shaped structural members and/or ATL assemblies, the energy absorber 79 may be used on differently shaped structural members and/or ATL assemblies within the same vehicle 10, and/or within different types of vehicles 10.

The creases 80 may be formed in the energy absorber 79 by calendering. In particular, a plurality of wheels (not shown) may be provided adjacent to the exit of the extrusion die 62. As the extrusion exits the extrusion die 62, the wheels may be configured to form the creases 80 in the energy absorber 79 in a known manner.

Figure 6A:
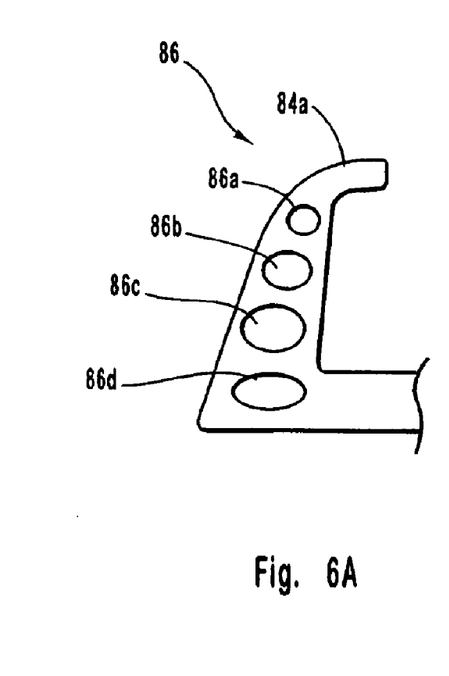
FIG. 6A is a side plan view of an energy absorber that has a plurality of hollow cavities with a substantially circular cross-section.
Figure 6B:
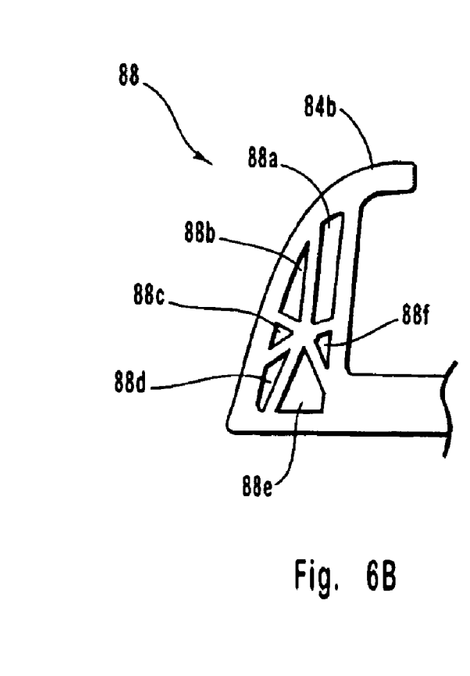
FIG. 6B is a side plan view of an energy absorber that has a plurality of hollow cavities with a substantially triangular cross-section.
Figure 6C:
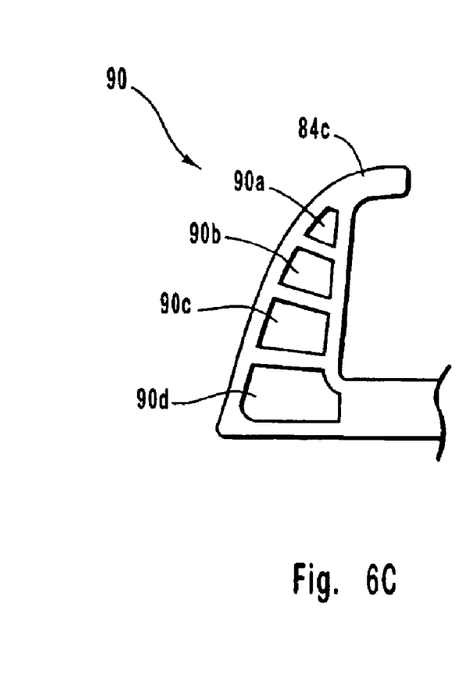
FIG. 6C is a side plan view of an energy absorber that has a plurality of hollow cavities with a substantially rectangular cross-section.

Referring now to FIGS. 6A, 6B, and 6C, there are shown side plan views of energy absorbers 84a, 84b, and 84c in accordance with the invention. The hollow cavities within the interior portion 38 of the energy absorber 34 may possess any suitable shape. For example, FIG. 6A depicts hollow cavities 86a, 86b, 86c, and 86d possessing a substantially circular cross-section. FIG. 6B depicts hollow cavities 88a, 88b, 88c, 88d, 88e, and 88f possessing a substantially triangular cross-section. Finally, FIG. 6C depicts hollow cavities 90a, 90b, 90c, and 90d possessing a substantially rectangular cross-section. Differently shaped hollow cavities possess different levels of resistance to being crushed. For example, the hollow cavities 86 having a substantially circular cross-section are less resistant to being crushed than the hollow cavities 88 having a substantially rectangular cross-section. Of course, the differently shaped hollow cavities 86, 88, and 90 depicted in FIGS. 6A–6C are exemplary only; an energy absorber in accordance with the invention may include hollow cavities having any number of other shapes.

From the above discussion, it will be appreciated that many of the problems associated with known energy absorbers are addressed by the teachings of the present invention. The present invention provides an energy absorber that will absorb energy from a collision even if the impact force is off-axis (i.e., not exactly perpendicular) to the energy absorber. In addition, an energy absorber in accordance with the invention may be fabricated relatively easily at a lower cost than existing energy absorbers, and may be used on differently shaped structural members and/or ATL assemblies within the same vehicle, or within different types of vehicles.

The present invention may be embodied in other specific forms without departing from its essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed is:

1. An energy absorber for protecting the occupants of a vehicle, comprising:
   an interior portion;
   a first contact surface at least partially surrounding the interior portion, the first contact surface being attachable to a structural member of the vehicle, and being conformable to a shape of the structural member;
   a second contact surface opposite the first contact surface, the second contact surface being configured to be attached to an adjustable turning loop (ATL, assembly wherein the structural member has a first shape, wherein the first contact surface is capable of conforming to match the first shape, wherein the ATL assembly has a second shape matching the first shape, and wherein the second contact surface is capable of conforming to match the second shape; and
   at least one hollow cavity extending through the interior portion in a direction substantially parallel to the first contact surface;
   wherein the first contact surface absorbs energy from occupant impact with an interior trim piece by deforming into the hollow cavity.

2. The energy absorber of claim 1, wherein the structural member has a first shape, and wherein the first contact surface is capable of conforming to match the first shape.

3. The energy absorber of claim 1, wherein the structural member and the ATL assembly are curved.

4. The energy absorber of claim 1, wherein the ATL assembly has a first length, wherein the second contact surface has a second length, and wherein the second length is substantially equal to the first length.

5. The energy absorber of claim 1, wherein the ATL assembly has a first length, wherein the second contact surface has a second length, and wherein the second length is greater than the first length.

6. The energy absorber of claim 1, wherein the interior portion comprises a curved portion.

7. The energy absorber of claim 6, wherein the hollow cavity extends through the curved portion in a direction substantially parallel to the first contact surface.

8. The energy absorber of claim 1, wherein the first contact surface and the interior portion each comprise at least one crease.

9. The energy absorber of claim 1, wherein the hollow cavity possesses a substantially rectangular cross-section.

10. The energy absorber of claim 1, wherein the hollow cavity possesses a substantially circular cross-section.

11. The energy absorber of claim 1, wherein the hollow cavity possesses a substantially triangular cross-section.

12. The energy absorber of claim 1, wherein the hollow cavity is formed by conveying an extrudable material through a die.

13. The energy absorber of claim 12, wherein the extrudable material is selected from the group consisting of a crystalline resin, a polypropylene resin, or a polyvinyl chloride ("PVC") resin.

14. An energy absorber for protecting the occupants of a vehicle, comprising:
   an interior portion;
   a first contact surface at least partially surrounding the interior portion, the first contact surface being attachable to a structural member of the vehicle, and being conformable to a shape of the structural member;
   a second contact surface opposite the first contact surface, the second contact surface being attachable to an adjustable turning loop (ATL) assembly wherein the first contact surface, the second contact surface, and the interior portion each comprise at least one crease; and
   more than one hollow cavity extending through the interior portion in a direction substantially parallel to the first contact surface;
   wherein the second contact surface absorbs energy from occupant impact with an interior trim piece by deforming into the hollow cavity.

15. The energy absorber of claim 14, wherein the structural member has a first shape, wherein the first contact surface is capable of conforming to match the first shape, wherein the ATL assembly has a second shape matching the first shape, and wherein the second contact surface is capable of conforming to match the second shape.

16. The energy absorber of claim 15, wherein the structural member and the ATL assembly are curved.

17. The energy absorber of claim 14, wherein the ATL assembly has a first length, wherein the second contact surface has a second length, and wherein the second length is substantially equal to the first length.

18. The energy absorber of claim 14, wherein the ATL assembly has a first length, wherein the second contact surface has a second length, and wherein the second length is greater than the first length.

19. The energy absorber of claim 14, wherein the interior portion comprises a curved portion.

20. The energy absorber of claim 19, wherein the hollow cavity extends through the curved portion in a direction substantially parallel to the first contact surface.

21. The energy absorber of claim 14, wherein the hollow cavity possesses a substantially rectangular cross-section.

22. The energy absorber of claim 14, wherein the hollow cavity possesses a substantially circular cross-section.

23. The energy absorber of claim 14, wherein the hollow cavity possesses a substantially triangular cross-section.

24. The energy absorber of claim 14, wherein the hollow cavity is formed by conveying an extrudable material through a die.

25. The energy absorber of claim 24, wherein the extrudable material is selected from the group consisting of a crystalline resin, a polypropylene resin, or a PVC resin.

26. An energy absorber for protecting the occupants of a vehicle, comprising:
   an interior portion comprising a substantially straight portion and a curved portion;

a first contact surface at least partially surrounding the interior portion, the first contact surface being attachable to a structural member of the vehicle;

a second contact surface opposite the first contact surface, the second contact surface being attachable to an adjustable turning loop (ATL) assembly;

a first hollow cavity extending through the substantially straight portion in a direction substantially parallel to the first contact surface; and a second hollow cavity extending through the curved portion in a direction substantially parallel to the first contact surface;

wherein the second contact surface absorbs energy from occupant impact with an interior trim piece by deforming into the first hollow cavity.

27. The energy absorber of claim 26, wherein the structural member has a first shape, wherein the first contact surface is capable of conforming to match the first shape, wherein the ATL assembly has a second shape matching the first shape, and wherein the second contact surface is capable of conforming to match the second shape.

28. The energy absorber of claim 27, wherein the structural member and the ATL assembly are curved.

29. The energy absorber of claim 26, wherein the ATL assembly has a first length, wherein the second contact surface has a second length, and wherein the second length is substantially equal to the first length.

30. The energy absorber of claim 26, wherein the ATL assembly has a first length, wherein the second contact surface has a second length, and wherein the second length is greater than the first length.

31. The energy absorber of claim 26, wherein the first contact surface, the second contact surface, and the interior portion each comprise at least one crease.

32. The energy absorber of claim 26, wherein the first hollow cavity and the second hollow cavity each possess a substantially rectangular cross-section.

33. The energy absorber of claim 26, wherein the first hollow cavity and the second hollow cavity each possess a substantially circular cross-section.

34. The energy absorber of claim 26, wherein the first hollow cavity and the second hollow cavity each possess a substantially triangular cross-section.

35. The energy absorber of claim 26, wherein the first hollow cavity and the second hollow cavity are both formed by conveying an extrudable material through a die.

36. The energy absorber of claim 35, wherein the extrudable material is selected from the group consisting of a crystalline resin, a polypropylene resin, or a polyvinyl chloride ("PVC") resin.

* * * * *